No. 630,054. Patented Aug. 1, 1899.
F. W. & E. HEYMANN.
CARRIAGE FRAME.
(Application filed Sept. 15, 1898.)
(No Model.)
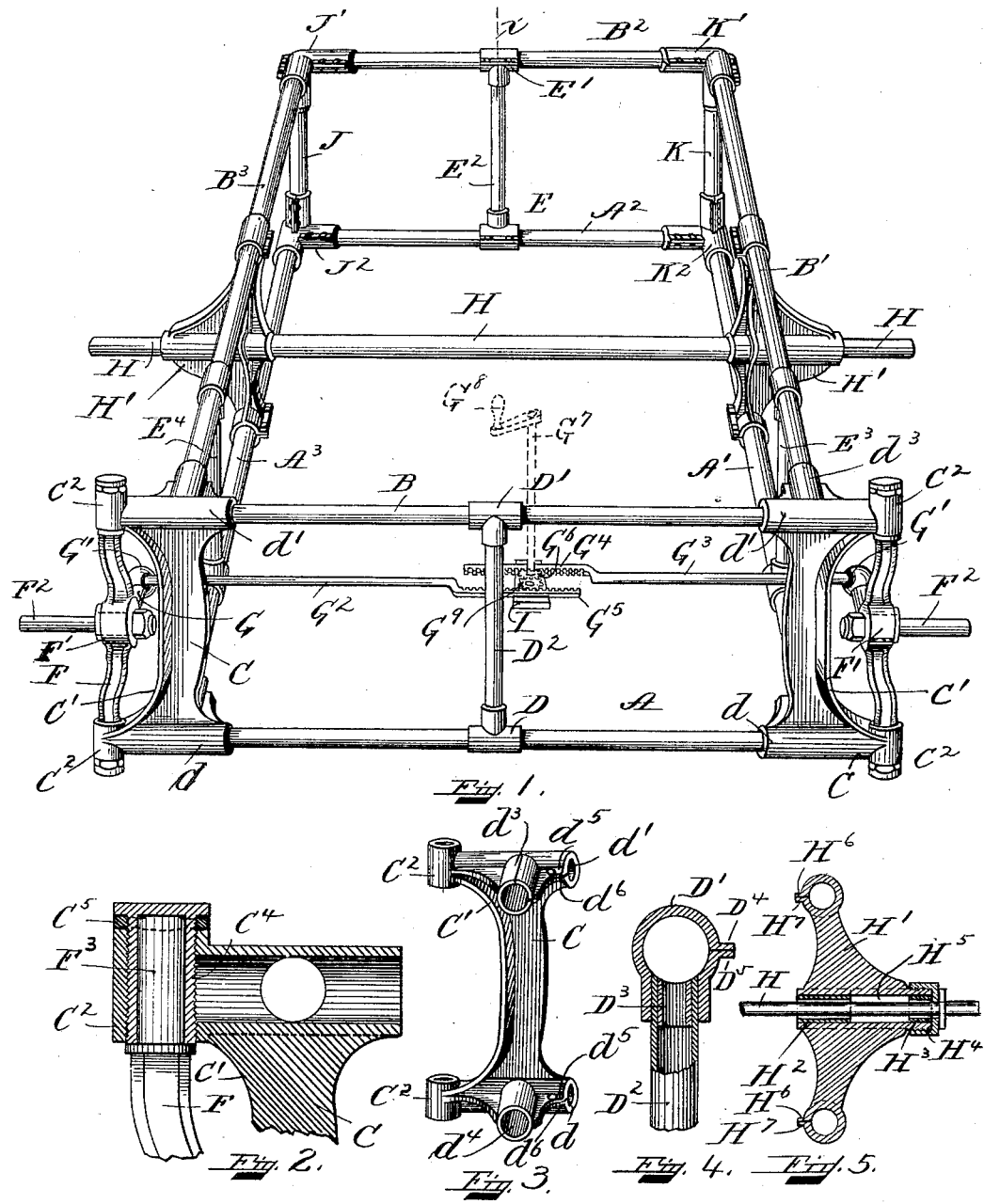
Witnesses:
Inventors:
Frank W. Heymann
Edward Heymann

UNITED STATES PATENT OFFICE.

FRANK W. HEYMANN AND EDWARD HEYMANN, OF BOSTON, MASSACHUSETTS, ASSIGNORS TO THE HEYMANN MOTOR VEHICLE AND MANUFACTURING COMPANY, OF PORTLAND, MAINE.

CARRIAGE-FRAME.

SPECIFICATION forming part of Letters Patent No. 630,054, dated August 1, 1899.

Application filed September 15, 1898. Serial No. 691,023. (No model.)

*To all whom it may concern:*

Be it known that we, FRANK W. HEYMANN and EDWARD HEYMANN, of Boston, in the county of Suffolk and State of Massachusetts, have invented certain new and useful Improvements in Carriage-Frames, of which the following is a specification.

Our invention relates to improvements in carriage-frames; and its objects are, first, to obtain a rigid frame of tubing for the purpose of making the frame light; second, economy of manufacture, and, third, the mounting of the opposite front steering-wheels on independent shafts in such a manner as to turn the same instead of mounting them on one direct axle extending from side to side of the carriage-frame. The advantage of thus mounting the wheels is that each wheel turns on a small bearing on the ground and can therefore be turned easily, whereas if the opposite wheels were mounted on one direct axle from end to end it is clear that in turning one wheel has to be skid forward, while the other is skid rearward. Therefore by this construction there is provided mechanism for producing an easy and ready manipulation of the wheels.

Our invention consists of certain novel features hereinafter described, and particularly pointed out in the claims.

In the accompanying drawings, which illustrate a construction embodying our invention, Figure 1 is a perspective view from the front. Fig. 2 is a detail sectional view through the top head of the bracket and through a portion of the swivel-joint of one of the front wheels. Fig. 3 is a detail side view of one of the brackets. Fig. 4 is a sectional view through one of the T's on the line X X, Fig. 1. Fig. 5 is a sectional view through one of the bearings of the rear axle.

Like letters of reference refer to like parts throughout the several views.

The opposite front steering-wheels are mounted on independent axles $F^2$, which are fast in the central bearings $F'$ of the swivels F, which are provided at their upper and lower ends with the bearings $F^3$, as shown in Fig. 2. By this construction it is easier to turn the wheels, because there is less leverage, and each wheel turns on a small portion of its tire as a pivot.

The carriage-frame is composed of four lower tubes A, A', $A^2$, and $A^3$ and four upper tubes B, B', $B^2$, and $B^3$. Both ends of the tubes A and B are slipped into the openings $d\,d'$ of the opposite brackets C, and the front ends of the tubes A' B' and $A^3$ and $B^3$ are slipped into the openings $d^4\,d^3$ of the opposite brackets C. The rear ends of the tubes A' and B' are slipped into the elbow-joints $K^2$ K', and the rear ends of the tubes $A^3$ $B^3$ are slipped into the elbow-joints $J^2$ J'. The front tubes A and B are braced at the center by the tube $D^2$, the ends of which are located in the opposite T's D D'. To reinforce the connection of the tube $D^2$ and the T's D D' in order to get stability of the parts, the opposite ends of the tube $D^2$ are heated, and when hot the inner ring $D^3$ is inserted cold, so that the tube shrinks and confines and reinforces the ring. The bracing-tube $E^2$ is held in the T's E E' in a manner similar to that described for the tube D, and the side bracing-tubes $E^3$ and $E^4$ are similar in construction and arrangement to the tube D. The rear tube $A^2$ has its opposite ends secured in the elbow T's $J^2$ $K^2$, and at its center is located the T E, to which is secured the lower end of the tube $E^2$. The upper tube $B^2$ has its opposite ends secured in the opposite elbow T's J' K', and at its center is located the T E', to which is secured the upper end of the tube $E^2$. At each end of the rear axle H in the bearing H' two bushings $H^2$ $H^3$, with suitable antifriction-rollers, are provided, leaving a space $H^5$, into which oil is introduced. By mounting the bushings $H^2$ $H^3$ at opposite ends of the bearing H' there is provided a long bearing and there is less friction, and, further, this construction makes the device lighter than if the bushing extended the entire length of bearing H'. A dust-cap $H^4$ is secured around the rear end of the bearing H', and through it the axle H extends to receive the rear wheels.

All the T's and the openings of the brackets in which the tubes are inserted are split in order that the tubes may be easily inserted, and after the insertion of the tubes the opposite elbows are riveted together, and in this manner all the parts are held rigidly in their proper positions.

The T D' is split, as shown in Fig. 4, and the opposite elbows are riveted together after the tube B has been passed through, and the T's D, E, and E' and also the T's which connect the tubes $E^3$ and $E^4$ are constructed in a similar manner. The bearings H' have a rear axle H split at their upper and lower ends, and the lips $H^6$ and $H^7$ are clamped together and riveted after the tubes A', B', $A^3$, and $B^3$ have been passed through. The same arrangement of splitting and riveting is provided for the elbow T's J' K' and $J^2$ $K^2$. The brackets C are likewise split at the top and bottom, and the lips $d^5$ and $d^6$ thus formed are clamped and riveted together after the tubes A and B and the front ends of the tubes A' B' and $A^3$ $B^3$ are slipped into place. In this construction of carriage-frame it will be obvious that after the parts are assembled and secured, as hereinbefore described, a rigid and stable frame is provided, which at the same time is light, owing to the lightness of the parts of which the frame is composed. To the rear side of the bearings F' of each swivel F is rigid an arm G, which at its rear end is provided with a ball-and-socket joint G', and from said joint extend inwardly the rods $G^2$ $G^3$, arranged, respectively, on the left and right hand sides. The rod $G^3$ is provided at its end with a rack-bar $G^4$, and the rod $G^2$ is provided on its end with a rack-bar $G^5$. Working with the rack-bar $G^4$ is a gear-wheel $G^6$, operated by the rod $G^7$, provided with a handle $G^8$, and the gear-wheel $G^6$ meshes with the gear-wheel $G^9$, which in turn works with the rack-bar $G^5$ on the end of the rod $G^2$. By turning the handle $G^8$ it is clear that as said handle is moved toward the left it will cause the rod $G^3$ to move outwardly, and the gear-wheel $G^6$ in causing this movement will operate the gear-wheel $G^9$ and cause the rod $G^2$ to move inwardly, so that the wheels will both be right oblique to the operator, (or left oblique when looking at the drawings,) and upon the wheels assuming such position said wheels will turn toward the right. After the handle $G^8$ is turned toward the right the opposite result is produced—namely, that the wheels will be left oblique to the operator, (or right oblique when looking at the drawings,) so that the carriage will turn toward the left. It is obvious in these movements that one wheel does not have to be skid forward and the other skid rearward, as would be the case if both wheels were mounted on one axle extending from side to side; but each wheel turns on a small portion of its tire as a pivot and readily assumes the desired position, so as to easily and readily change the direction of travel of the carriage. The rack-bars and the gear-wheels are carried by the plate I, which is supported in any desirable manner by the frame of the carriage.

The upper and lower bearings of the swivels in the brackets C are similar in construction, and a description of one of them (illustrated in Fig. 2) will apply to all. Referring now to Fig. 2, there is secured in the housing $C^2$ of the bracket a threaded thimble $C^4$, and below the flanged edge C' of said thimble a check-nut $C^5$ is located for the purpose of holding the thimble in its adjusted position. Within the space in the thimble $C^4$ is located the bearing $F^3$ of the swivel F. The upper and lower bearings of each swivel being constructed as described, it is obvious that the wheels are capable of ready movement when it is desirable to change the direction of travel of the carriage.

We do not limit ouselves to the arrangement and construction shown, as the same may be varied without departing from the spirit of our invention.

Having thus ascertained the nature of our invention and set forth a construction embodying the same, what we claim as new, and desire to secure by Letters Patent of the United States, is—

1. In a carriage-frame, the combination of upper and lower tubes, a bracket connecting said tubes and having bearings in its upper and lower ends, an independent swivel journaled in said bearings, an axle carried by said swivel, and means for turning said swivel in its bearings.

2. In a carriage-frame, the combination of opposite brackets, upper and lower front tubes secured at their ends in said brackets, a reinforcing-tube connecting said front tubes intermediate of their ends, upper and lower side tubes secured at their front ends in said brackets, reinforcing-tubes connecting the upper and lower side tubes intermediate of their ends, upper and lower rear tubes, a reinforcing-tube connecting said rear tubes intermediate of their ends, elbows connecting the ends of said rear tubes with the ends of said side tubes, and tubes connecting the upper and lower of said elbows.

3. In a carriage-frame, the combination of upper and lower tubes, a bracket connecting said tubes, thimbles mounted in the upper and lower ends of said bracket to form bearings, an independent swivel journaled in said bearings, an axle carried by said swivel, and means for turning said swivel in said bearings.

4. In a carriage-frame, the combination of sections of tubing forming the same, means for connecting said sections together, brackets forming part of said connecting means, independent swivels journaled in said brackets, independent axles carried by said swivels, arms extending from said swivels, rods connected to said arms by ball-and-socket joints, and mechanism consisting of rack-bars on the ends of said rods and two gear-wheels operating on one another adapted in their movement to move said rack-bars and rods to turn said swivels to move said axles in the same direction.

In testimony whereof we have signed our names to this specification, in the presence of two subscribing witnesses, this 8th day of September, 1898.

FRANK W. HEYMANN.
EDWARD HEYMANN.

Witnesses:
A. L. MESSER,
C. A. STEWART.